United States Patent [19]

Huggins

[11] Patent Number: 4,964,727
[45] Date of Patent: Oct. 23, 1990

[54] MULTI-TRACK ANALOG OPTICAL SENSING SYSTEM AND METHOD

[75] Inventor: Raymond W. Huggins, Mercer Island, Wash.

[73] Assignee: The Boeing Company, Seattle, Wash.

[21] Appl. No.: 275,208

[22] Filed: Nov. 23, 1988

[51] Int. Cl.$^5$ ............................................. G01B 11/14
[52] U.S. Cl. .................................... 356/373; 250/226; 341/13
[58] Field of Search ............... 356/373, 375, 395, 374; 250/226, 227, 568; 341/13

[56] References Cited

U.S. PATENT DOCUMENTS

| | | |
|---|---|---|
| 4,223,216 | 9/1980 | Quick et al. |
| 4,334,152 | 6/1982 | Dakin et al. |
| 4,740,688 | 4/1988 | Edwards. |
| 4,849,624 | 7/1989 | Huggins ............................ 250/226 |

OTHER PUBLICATIONS

K. Fritsch and G. Beheim, "Wavelength-Division Multiplexed Digital Optical Position Transducer," Optics Letters, 11:1–3, Jan. 1986.
Norris Lewis, "Fiber Optic Sensors Offer Advantages for Aircraft," *SPIE Optical Engineering Reports,* Jun. 1987.

Primary Examiner—Richard A. Rosenberger
Assistant Examiner—Hoa Pham
Attorney, Agent, or Firm—Christensen, O'Connor, Johnson & Kindness

[57] ABSTRACT

An optical sensor and an optical sensing system and method in which both analog and digital techniques are employed. The sensor comprises an encoder and an illumination source. The encoder includes a plurality of tracks, and the illumination source illuminates each track with an associated optical input signal. Each input signal comprises light in a wavelength range different from the wavelength ranges of the other input signals. Each track includes means responsive to the value of a measurand for modulating the intensity of the associated input signal, in one of N different ways, to produce a corresponding modulated signal, N being greater than 2. The intensities of the modulated signals thereby encode the value of the measurand. The illumination source may also produce a reference signal that is not modulated by the measurand. The modulated and referenced signal may be combined into an output signal, and the composite input signal and output signals may be conveyed to and from the sensor via fiber-optic cables.

26 Claims, 7 Drawing Sheets

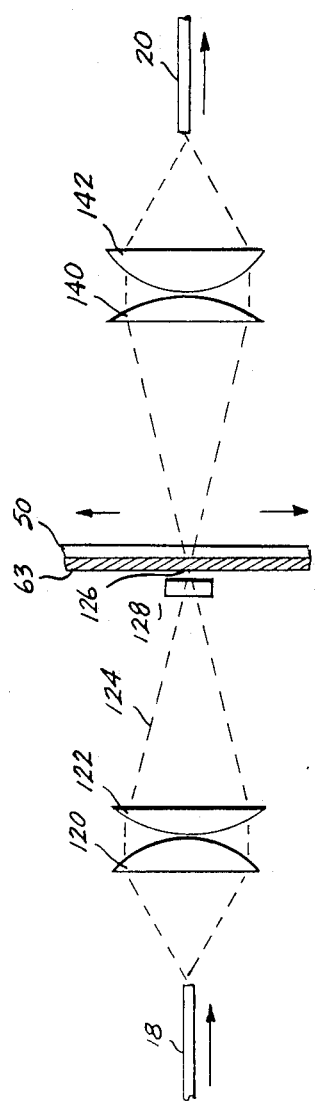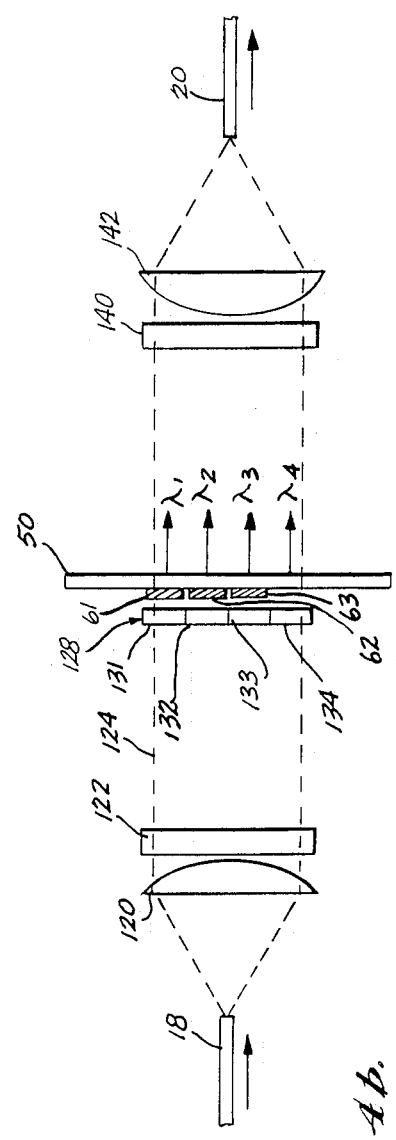
Fig.4a.
Fig.4b.

$D_0$ $D_1$ $D_2$ $D_3$ $D_4$ $D_5$ $D_6$ $D_7$ $D_8$ $D_9$
_Fig. 10A._
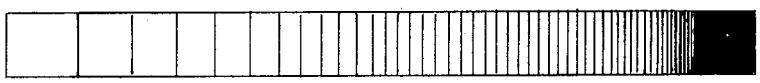
_Fig. 10B._
_Fig. 10C._
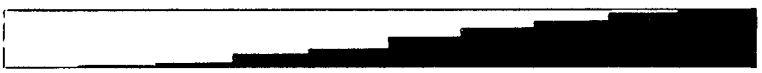
_Fig. 10d._
_Fig. 10e._

MULTI-TRACK ANALOG OPTICAL SENSING SYSTEM AND METHOD

FIELD OF THE INVENTION

The present invention relates to optical sensing systems, and in particular to a multi-track analog sensing system and method in which optical signals may be coupled to and from the sensor using optical fibers.

BACKGROUND OF THE INVENTION

A number of attempts have been made to design and fabricate high precision optical sensing systems in which a position sensor is coupled to an optical source and detector using optical fibers. In one known type of system, an encoder is attached to a movable member, and the position of the member is determined by optically interrogating the encoder. The member may be one that rotates, in which case the encoder may comprise a disk that rotates with the member, or may be linearly movable, in which case the encoder moves linearly along with the member.

In an analog system, the encoder typically includes a track that has a continuously variable optical property, such as a continuously variable density or transmission coefficient. Optical energy is transmitted to the encoder by an optical fiber, passes through the variable density track, and is then coupled back to a suitable detector by an optical fiber. Couplers are used to connect the optical fibers to one another, and to other components of the sensor system. The couplers allow each fiber path to be constructed from several discrete lengths of optical fiber. However, such couplers have insertion losses that are neither negligible nor exactly reproducible. Thus the optical attenuation of the fiber-optic link is an unknown and variable factor that must be determined before the position of the encoder can be inferred solely from an end-to-end attenuation measurement. The link attenuation can be measured by transmitting two optical signals having different wavelengths to and from the sensor, and by designing the sensor such that only one signal is attenuated as a function of the encoder position. Such a system may be termed a two wavelength referenced system. Alternatively, the optical modulation technique inside the sensor must be such that the position of the encoder can be found indepently of the fiber link losses.

Attemps have been made to fabricate high-precision, two-wavelength referenced analog encoding systems. However, it has been found that the performance of such systems is limited by the differential loss resulting from the variable stability of the different mode structures of the two optical signals progating along the fibers. The stability of two wavelength referenced systems is generally accepted to be about 1 percent.

In a digital encoding system, the encoder includes a number of parallel coded tracks, each of which represents a specific bit in a binary word. Each track comprises a series of elements, each of which has an optical property that can assume one of two states, such as transmitting or nontransmitting. For each posiition of the digital encoder, the tracks will present a different set of elements, and therefore a different binary word, to the optical interrogation system. The precision is limited only by the highest achievable element density of the least significant track. Wavelength division multiplexing (WDM) is used to interrogate each track with light in a different wavelength range. This arrangement permits optical signals to be coupled to and from the sensor along single fiber-optic cables.

WDM digital encoding systems have been described that use a combination of a GRIN rod lens, a prism, and diffraction grating. Such a system is optically complicated and inefficient, and requires a broad band source for operation. A fundamental problem common to all WDM encoders that use a diffraction grating as the dispersive element is that a reasonably well-collimated beam is required if reasonable resolution and channel width are to be obtained. In particular, one dimension of the beam should be no wider than the dimensions of the elements of the least significant track along the length of the track. This implies that either the encoder element length should be 50-100 times the fiber diameter, or that the beam should be severely masked with a slit. A compromise must therefore be made between resolution, optical efficiency, and the physical size of the sensor. Similar considerations apply to the use of interference filters to demultiplex the channels.

SUMMARY OF THE INVENTION

The analog and WDM digital encoding systems discussed above represent the state-of-the-art, and unfortunately fall short of many performance requirements, particularly with respect to size and precision. The present invention provides a novel sensor and a novel sensing (e.g., encoding) system and method in which both analog and WDM techniques are employed, to produce a significant increase in accuracy for a given sensor size.

The sensor of the present invention comprises encoding means and illumination means. The encoding means includes a plurality of tracks, and the illumination means illuminates each track with an associated optical input signal. Each input signal comprises light in a wavelength range different from the wavelength ranges of the other input signals. Each track includes means responsive to the value of a measurand for modulating the intensity of the associated input signal in one of N different ways to produce a corresponding modulated signal, N being greater than 2. The intensities of the modulated signals thereby encode the value of the measurand. Both transmitting and reflecting embodiments are disclosed.

In a preferred sensing system, a source produces a composite input signal that includes light in each wavelength range. The composite input signal is conveyed to the sensor by fiber-optic cable means. The illumination means demultiplexes the composite input signal to produce the input signals associated with each track. The sensor includes combining means for combining the modulated signals to produce an output signal. The demultiplexing and combining may be carried out by means of interference filters, prisms, diffraction gratings, or other suitable means.

In the output and composite input signals, the different wavelength ranges may occur simultaneously, or in a time division multiplexed fashion. The output signal is conveyed to a detector that detects the intensity of light in each of the wavelength ranges in the output signal, to thereby determine the value of the measurand. The illumination means preferably produces a reference signal comprising light in a reference wavelength range different from the wavelength ranges of the input signal. The combining means combines the reference signal with the modulated signals to produce the output signal, and the detector detects light in the reference wavelength range in order to measure system losses that are independent of measurand value.

BRIEF DESCRIPTION OF THE DRAWINGS

FIGS. 4a and 4b provide top and side views of an optical schematic of the sensor;

FIGS. 10a-10e illustrate five techniques for providing an encoder track having three or more density levels.

DETAILED DESCRIPTION OF A PREFERRED EMBODIMENT

Figure 1:
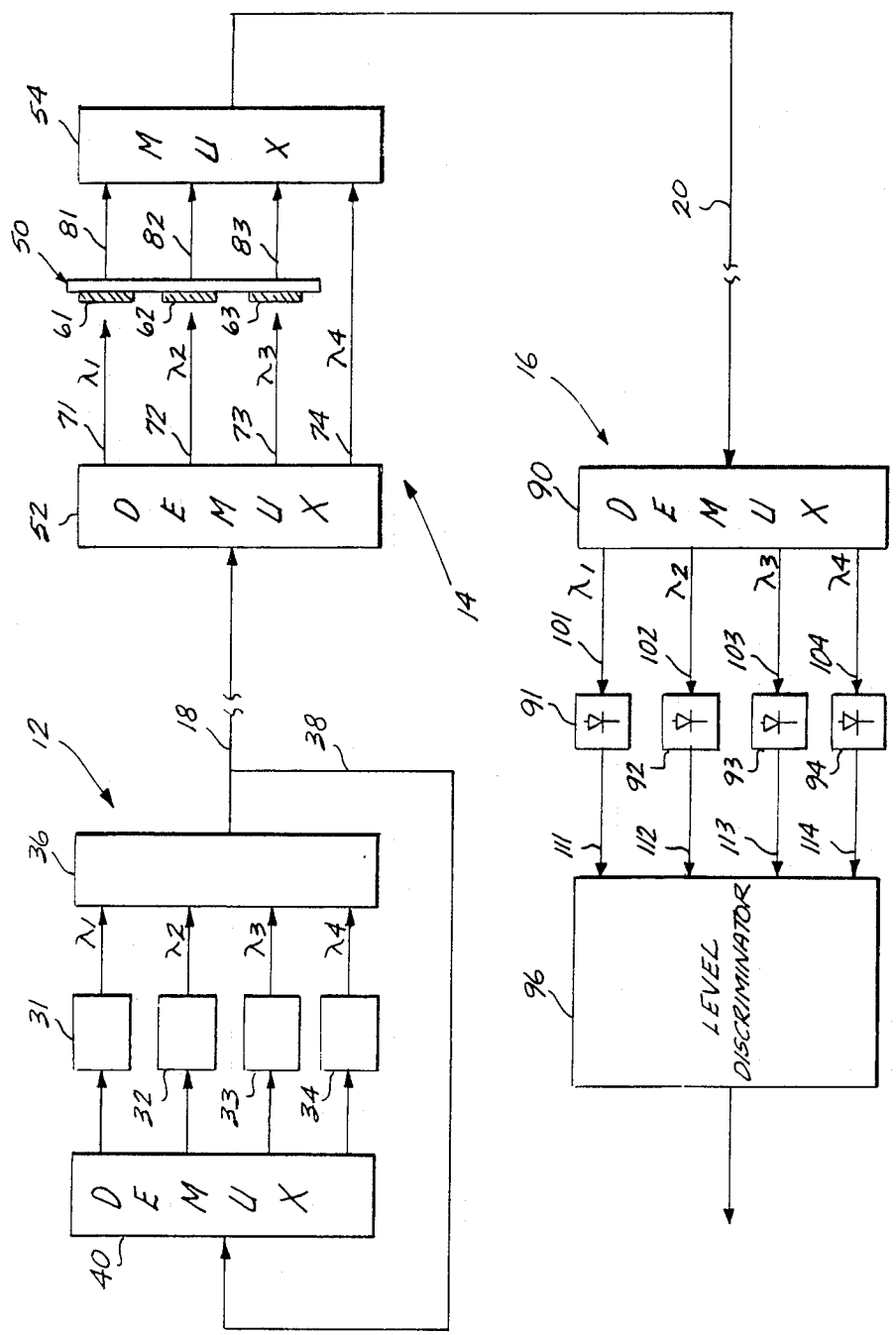
FIG. 1 is a schematic diagram of an optical sensing system according to the present invention.

One preferred embodiment of the optical sensing system of the present invention is illustrated in schematic form in FIG. 1. The sensing system comprises source 12, sensor 14, and detector 16. The source is coupled to sensor 14 by fiber-optic cable 18, and the detector is coupled to sensor 14 by fiber-optic cable 20. The sensor can therefore be located at a position remote from the source and detector.

Source 12 comprises optical emitters 31-34 that produce light in four different wavelength ranges, designated $\lambda_1$, $\lambda_2$, $\lambda_3$, and $\lambda_4$, respectively. By way of example, emitters 31-34 could be four LEDs that produce light centered at 730, 770, 810, and 865 nanometers respectively. Light from emitters 31-34 is combined by optical combining means 36 to produce a composite input signal on fiber-optic cable 18. A small portion of the light on fiber-optic cable 18 is coupled by fiber-optic cable 38 to demultiplexer 40, to provide a level control loop for the emitters. In the level control loop, demultiplexer 40 detects the intensity of the light on fiber-optic cable 38 in each of the four wavelength ranges $\lambda_1$-$\lambda_4$, and provides appropriate control signals to emitters 31-34 to maintain a constant illumination intensity in each wavelength range. It will be appreciated that illumination source 12 could also comprise a single broadband emitter such as an incandescent bulb, rather than the plurality of discrete emitters illustrated in FIG. 1. However, one advantage of using discrete emitters is that a time division multiplexed system can be used in which the discrete emitters are sequentially pulsed on and off, thereby permitting some simplification of the design of the remainder of the system, as further described below.

Senor 14 comprises encoder 50, demultiplexer 52, and multiplexer 54. Typically, the encoder is coupled to a movable member whose position is to be sensed. More generally, sensor 14 could be constructed such that encoder 50 moves in response to an arbitrary measurand. In the illustrated example, the encoder includes three tracks 61, 62, and 63, the tracks being indicated in cross section in FIG. 1, i.e., the encoder 50 moves in a direction normal to the plane of the drawing.

As described in greater detail below, in the illustrated embodiment, each track comprises a series of modulation elements, each of which can have one of four optical densities, i.e., one of four transmission coefficients. In an actual system, more than four possible densities would typically be used. Demultiplexer 52 receives the composite input signal on fiber-optic cable 18, and demultiplexes the composite input signal to produce demultiplexed input signals 71-73 and reference signal 74. Input signal 71-73 comprise portions (ideally all) of the light on fiber-optic cable 18 in wavelength ranges $\lambda_1$-$\lambda_3$ respectively, and reference signal 74 comprises a portion of the light on fiber-optic cable 18 in wavelength range $\lambda_4$. Input signals 71-73 fall on tracks 61-63, respectively. The sensor is constructed such that reference signal 74 either does not pass through encoder 50, or passes through a clear portion of encoder 50. Thus reference signal 74 is not modulated as a result of the movement of the encoder.

Light transmitted by encoder tracks 61-63 appears as modulated signals 81-83, respectively. Each of modulated signals 81-83 can have one of four levels or intensities, corresponding to the four possible optical densities of each modulation element of each track. Modulated signals 81-83 and reference signal 74 are combined by multiplexer 54 to produce an optical output signal on fiber-optic cable 20 that is transmitted to detector 16. In an alternate sensor embodiment, each modulation element of each track includes a variable size reflecting portion, and modulated signals 81-83 comprise the signals reflected from the respective tracks.

Detector 16 comprises demultiplexer 90, photodetectors 91-94, and level discriminator 96. Demultiplexer 90 demultiplexes the optical output signal on fiber-optic cable 20 to produce demultiplexed signals 101-104 that correspond to modulated signals 81-83 and reference signal 74, respectively. Signals 101-104 are then converted by photodetectors 91-94 into corresponding electrical output signals 111-114. Electrical output signals 111-113 therefore represent the current density of each of tracks 61-63, while electrical output signal 114 represents the attenuation in the loop that is independent of encoder position. Level discriminator 96 determines the ratio or difference between each of electrical output signals 111-113 and reference signal 114, to thereby determine the density of each track 61-63, and therefore the position of encoder 50. Level discriminator 96 can thus be regarded as a modulo N detector. The modulo N detector can be implemented by a series of comparators in an analog signal processing system, or by a look-up table in software in a digital signal processing system. In either case, the density of the modulation element of each track is obtained as a number to the base N. It will be appreciated that if source 12 operates in a time division multiplexed fashion, then demultiplexer 90 can be eliminated, and a single photodetector may be used.

Figure 2:
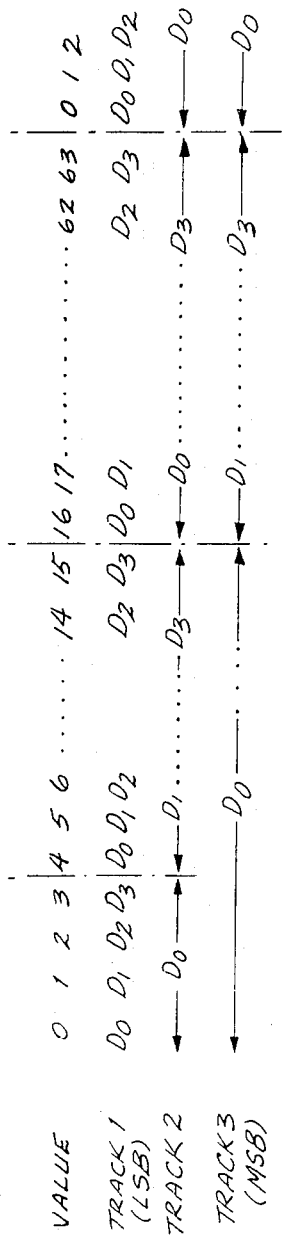
FIG. 2 illustrates one method of encoding a series of values with three tracks and four density levels.
Figure 3:
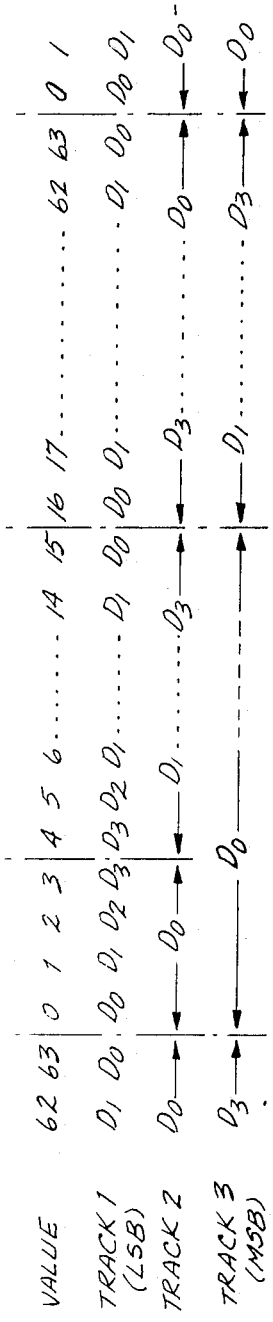
FIG. 3 illustrates a second technique for encoding the series of values.

FIGS. 2 and 3 illustrate two techniques for using the variable densities of the tracks to encode numeric values. In a system that includes M tracks and that has N different densities per track, the maximum number of values that can be encoded is $N^M$. Thus for the illustrated embodiment that includes three tracks (M=3), each track element having one of four different density levels $D_0$, $D_1$, $D_2$, or $D_3(N=4)$, values from zero through 63 may be encoded. As described in further detail below, a set of discrete density levels may be used, or the track can have a continuously variable density, with the conversion into discrete values occurring in level discriminator 96. The term "analog" as used herein includes both of these variations.

In the encoding technique shown in FIG. 2, track 1 is assumed to represent the least significant bit (LSB), and track 3 is assumed to represent the most significant bit (MSB). As illustrated, in encoding the sequence of values from 0-63, all three tracks begin at density $D_0$, corresponding to a value of zero. Track 1 then runs through its four density levels while tracks 2 and 3 remain at constant levels, whereupon track 2 changes to level $D_1$, and track 1 again runs through its four density levels, etc. When tracks 1 and 2 both reached density levels $D_3$, e.g., at the value 15, then track 3 changes to its next density level, and the process again repeats until at value 63, all three tracks are at level $D_3$.

In practice, it may be preferable to have an encoder in which only one track changes density at any one point in a continuous sequence of values, such as in the binary Grey code. The encoding technique shown in FIG. 2 can readily be converted into such an arrangement, as illustrated in FIG. 3. In the FIG. 3 arrangement, after a given track has run through its sequence of levels from $D_0$ through $D_3$, the next most significant track changes density levels, and the given track then runs through the sequence in reverse order, from $D_3$ to $D_0$. This insures that when a transition occurs in a given track, the less significant tracks remain the same at that transition, and thus only a single track changes its density at any given transition in a continuous sequence of values.

The stability or precision of the analog measurement need only be better than 1/N, where N (the number of density levels) will typically be between 4 and 20. A stability of one part in 20 (5%) is about 5 times easier to obtain than the accepted state of the art for analog systems. Such performance can be achieved without going to an excessive degree of optical complexity to insure modal stability of light propagating along the optical fiber, and without adopting overly complex signal processing methods. Also, the number of analog density levels does not have to be the same for each track. The more significant tracks can have fewer density levels, thus further reducing the performance requirements of the analog system. For example, a weighted three-track system with 16, 8 and 4 density levels for the least, middle and most significant tracks respectively gives a resolution of 1 in 512, or 9 bits. Residue arithmetic may also be used to reduce the required stability of the analog system.

Referring to source 12 (FIG. 1), demultiplexer 40 is in principle only required if sources 31-34 are operated in a CW rather than in a pulsed mode. However, if demultiplexer 40 has the same optical characteristics as demultiplexer 52 in sensor 14, then the effects of LED wavelength shifts due to temperature variations will be reduced. The inclusion of demultiplexer 40, even when time division multiplexing is used, is therefore beneficial if LED operating temperature variations are anticipated.

FIGS. 4a and 4b present top and side views, respectively, of an optical schematic of a preferred embodiment of the sensor. The composite input signal on fiber-optic cable 18 is collimated by collimating lens 120, and then focused along one cross-axis by cylindrical lens 122 to produce beam 124 that produces an illuminated line 126 on encoder 50. In passing from lens 122 to line 126, the light passes through filter array 128 that comprises four interference filters 131-134. Filters 131-133 are placed over tracks 61-63 respectively, and filter 134 is placed over a clear portion of encoder 50. The interference filters are butted up to one another, and select light in the four wavelength bands $\lambda_1$-$\lambda_4$, respectively. Thus, each of tracks 61-63 an the clear portion of the encoder are illuminated with light in the appropriate wavelength band. Light passing through encoder 50 in wavelength bands $\lambda_1$-$\lambda_4$ is converted into a circular beam by cylindrical lens 140, and the resulting circular beam is then focused by lens 142 into the end of fiber-optic cable 20, for conveyance to the detector.

In the arrangement shown in FIGS. 4a and 4b, light in each of the discrete wavelength bands is incident on each of filters 131-134. The efficiency of this system could be increased somewhat, although with a corresponding increase in complexity, by the use of a diffraction grating or prism as a dispersion element. It should also be apparent that the optical path shown in FIGS. 4a and 4b could be folded, if necessary, to satisfy packaging requirements.

Figure 5:
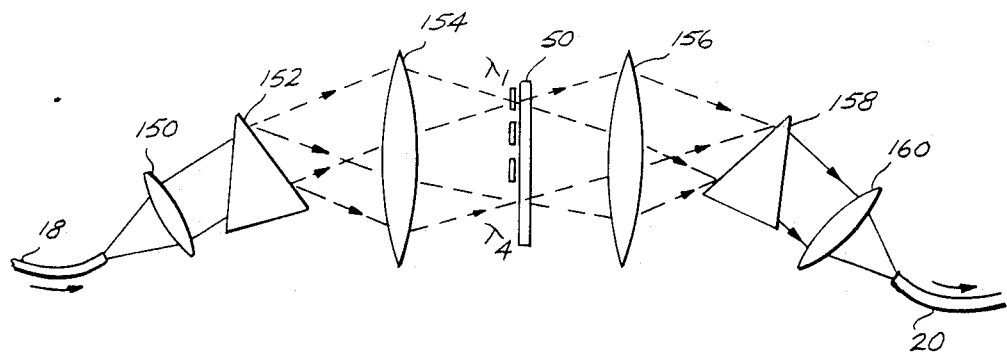
FIG. 5 is a optical schematic of a second preferred embodiment of the sensor.

A second embodiment of the sensor is illustrated in FIG. 5. In this embodiment, light from fiber-optic cable 18 is collimated by lens 150 and incident on one face of prism 152. The light is dispersed by the prism, and focused by lens 154 onto the tracks of encoder 50 such that the respective wavelength ranges $\lambda_1$ -$\lambda_4$ fall on the three tracks and on a clear area of the encoder, as with the embodiment of FIGS. 4a and 4b. Light transmitted through the encoder is then collected by lens 156, spectrally combined by prism 158 and focused by lens 160 into fiber-optic cable 20. Thus in this embodiment, the demultiplexing of the incoming light is performed by prism 152, and the multiplexing of the transmitted light is performed by prism 158. The embodiment of FIG. 5 has the advantage of having higher optical efficiency, but it is also more complex than the prior embodiment.

Figure 6:
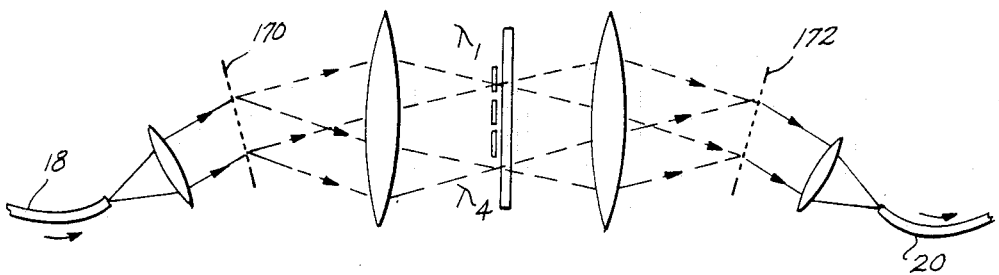
FIG. 6 is an optical schematic of a third preferred embodiment of the sensor.

FIG. 6 illustrates a third embodiment that is generally similar to the embodiment of FIG. 5, except that diffraction gratings 170 and 172 are used in place of prisms 152 and 158, respectively, to perform the demultiplexing and multiplexing.

Figure 7A:
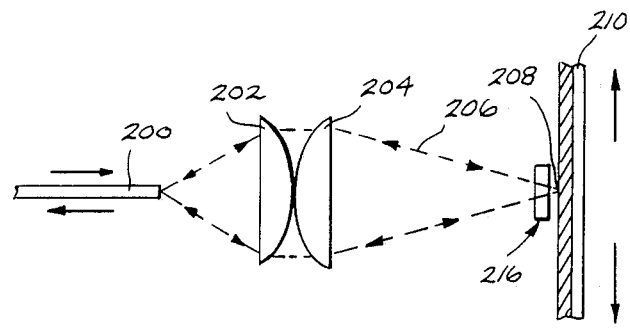
FIGS. 7a and 7b provide top and side views of an embodiment that operates by reflection rather than transmission.
Figure 7B:
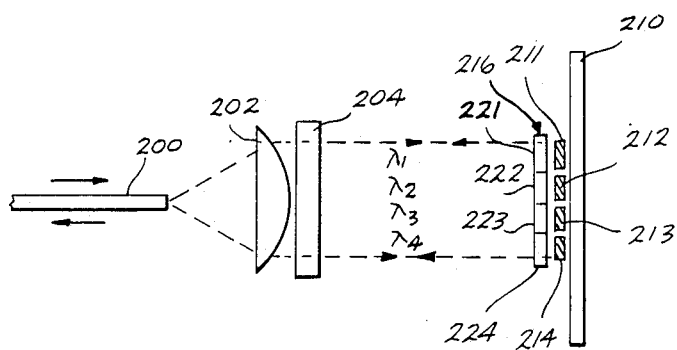

FIGS. 7a and 7b present top and side views, respectively, of an optical schematic of a reflecting embodiment of the sensor. A composite input signal on fiber-optic cable 200 is collimated by collimating lens 202, and then focused along one cross axis by cylindrical lens 204 to produce beam 206 that produces an illuminated line 208 on encoder 210. Encoder 210 includes three variable reflectivity reflecting tracks 211-213, and one constant reflectivity reflecting track 214. In passing from lens 204 to line 208, the light passes through filter array 216 that comprises four interference filters 221-224 that are positioned over tracks 211-214, respectively. The interference filters are butted-up to one another, and select light in the four wavelength bands $\lambda_1$-$\lambda_4$, respectively. Light reflected by the tracks then travels the same path in reverse through the filter array, and through lenses 202 and 204, and this reflected light is then coupled into fiber-optic cable 200 for transmission to the detector.

In the embodiment shown in FIGS. 7a and 7b, the element equivalent to the lowest density element in the transmission embodiment is highly reflecting, such that it reflects most of the light incident upon it, whereas the element equivalent to the highest density element in the transmission embodiment has a low reflectivity, and reflects only a small fraction of the incident light. Reference track 214 is preferably continuous and as highly reflecting as possible, or has a reflectivity equal to the highest reflectivity element. Encoder 210 is preferably made of a highly absorbing glass, so that light which is not reflected by the tracks is absorbed. This embodiment has the advantage that only one fiber-optic cable is required to interface this sensor with the transmitter and receiver.

Figure 8:
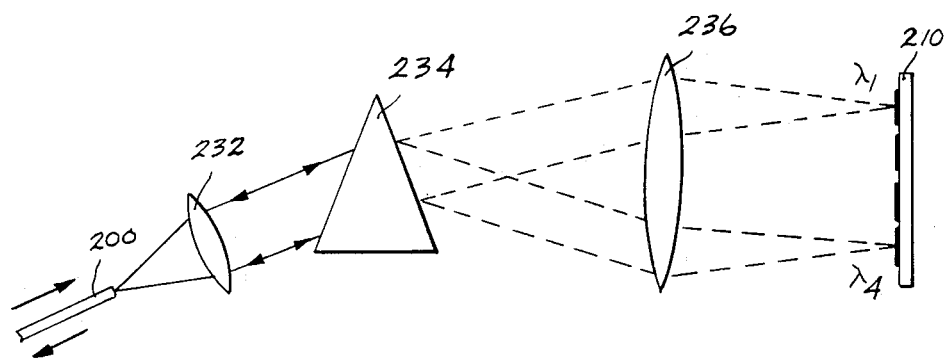
FIG. 8 provides an optical shematic of a second reflecting embodiment of the invention.

A second reflecting embodiment is illustrated in FIG. 8. In this case, light emerging from fiber-optic cable 200 is collimated by lens 232 and dispersed by prism 234. The dispersed light is collected by lens 236 and focused onto the encoder tracks, such that each track receives light in its appropriate wavelength range. Light reflected by the tracks then follows a reverse path through the optical system and into fiber-optic cable 200. As in the embodiment of FIGS. 7a and 7b, a high reflectivity track should be used for the reference track.

Figure 9:
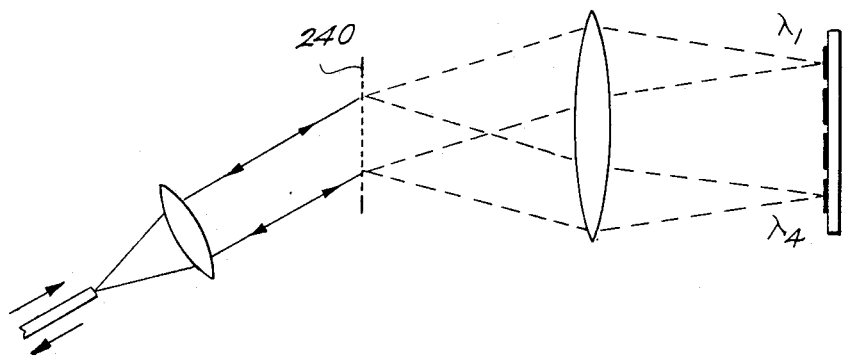
FIG. 9 provides an optical schematic of a third reflecting embodiment of the invention.

A third reflecting embodiment is illustrated in FIG. 9. This embodiment is similar to that shown in FIG. 8, except that diffraction grating 240 is used in place of prism 234 to demultiplex the incoming light and multiplex the reflected light. Ultimately, a GRIN rod lens, a diffraction grating, and a glass wedge could be employed, as shown in WAVELENGTH-DIVISION MULTIPLEXED DIGITAL OPTICAL POSITION TRANSDUCER, K. Fritsch and G. Beheim, Optics Letters Vol. 11 No. 1, Jan. 1986.

FIGS. 10a–10e illustrate different ways of realizing encoder tracks having three or more density levels. If each density level is to correspond to a discrete density, then variable density dot or line patterns may be used. FIG. 10a shows a portion of a track that includes ten modulation elements having density values $D_0$–$D_9$. Level $D_0$ is clear, level $D_9$ is almost or completely opaque, and intermediate density levels are created by means of a variable density dot pattern, as illustrated. FIG. 10b shows a similar technique, where variable density line patterns are used instead of variable density dot patterns. Obviously, a variable density pattern of transmitting dots or lines on an opaque background could also be used. Each modulation element could of course comprise a photographic or evaporative film having a different density. Another approach is one in which each modulation element comprises a variable single occluding member, as shown in FIGS. 10c and 10d. If, as is often the case, the value encoded by the encoder is a quantity such as shaft rotational position or slide position that varies monotonically, then the density variation over one cycle of N density levels may be producd by a continuous, monotonically varying pattern. Continuous variation of the density may be realized by a continuously varying dot or line density pattern, by a continuously varying density film, or by an occluding wedge as shown in FIG. 10e. In a system that is operated by reflection rather than by transmission, the light and dark areas in FIGS. 10a–10e would represent the reflecting and nonreflecting portions of each track, rather than the transmitting and nontransmitting portions as in the described embodiment. Although FIGS. 10a–10e show linear encoder tracks, circular could obviously be used, for example in a rotation sensor.

The encoder system of the present invention can readily be adapted to include fault detection features. Failure of any of the emitters can be sensed by monitoring the level control loop in fiber-optic cable 38 or demultiplexer 40 (FIG. 1). In addition, if the maximum density of any modulation element is such that a detectable signal is always incident on the detector, absence of a detectable signal will indicate an LED failure. The integrity of the optical fiber link can be sensed by monitoring the detected light at the reference wavelength. If the detected light falls below a predetermined level, failure or severe degradation of the link would be indicated.

While the preferred embodiments of the invention have been illustrated and described, variations will be apparent to those skilled in the art. For example, combinations of filters, prisms and diffraction grating could be used for the multiplexing and demultiplexing operations. Accordingly, the invention is not limited to the described embodiment, but is instead set forth in the following claims.

The embodiments of the invention in which an exclusive property or privilege is claimed are defined as follows:

1. A sensor for use in an optical sensing system for determining a value of a measurand, the sensor comprising:
    encoding means having a plurality of tracks;
    illumination means for illuminating each track with an associated optical input signal, each input signal comprising light in a wavelength range different from the wavelength ranges of the other input signals; and
    each track including means responsive to the value of the measurand for modulating the intensity of the associated input signal in one of N different ways to produce a corresponding modulated signal, N being greater than 2, whereby the intensities of the modulated signals encode the value of the measurand.

2. The sensor of claim 1, wherein the illumination means comprises means for receiving a composite input signal comprising light in each wavelength range, and means for demultiplexing the composite input signal to produce the respective optical input signals.

3. The sensor of claim 2, wherein the means for demultiplexing comprises a filter associated with each track, each filter including means for receiving a portion of the composite input signal and for preferentially selecting wavelength components in the associated wavelength range to form the input signal for the track.

4. The sensor of claim 3, wherein the filters form a linear array adjacent to the tracks, and wherein the means for demultiplexing comprises means for receiving the composite input signal and for forming the composite input signal into a linear beam that strikes the array.

5. The sensor of claim 2, wherein the means for demultiplexing comprises a prism for dispersing the composite input signal to produce the optical input signals.

6. The sensor of claim 2, wherein the means for demultiplexing comprises a diffraction grating for dispersing the composite input signal to produce the optical input signals.

7. The sensor of claim 1, further comprising means for combining the modulated signals to produce an output signal, whereby the intensity of light in the output signal in the respective wavelength ranges encodes the value of the measurand.

8. The sensor of claim 7, wherein the illumination means includes means for producing a reference signal comprising light in a reference wavelength range different from the wavelength ranges of the input signals, and wherein the means for combining includes means for combining the reference signal with the modulated signals to produce the output signal.

9. The sensor of claim 8, wherein the illumination means comprises means for receiving a composite input signal comprising light in each wavelength range including the reference wavelength range, and means for demultiplexing the composite input signal to produce the respective input signals and the reference signal.

10. The sensor of claim 1, wherein each track comprises a plurality of modulation elements, each modulation element comprising means for modulating the intensity of the associated input signal in one of the N ways.

11. The sensor of claim 10, wherein at least one of the modulation elements comprises a pattern of nontransmitting areas.

12. The sensor of claim 10, wherein at least N-1 modulation elements comprise a single nontransmitting area having a variable size.

13. The sensor of claim 10, wherein at least one of the modulation elements comprises a pattern of reflecting areas.

14. The sensing system of claim 1, wherein the measurand is the position of a movable member, wherein the encoder is coupled to the movable member such that the encoder moves when the movable member moves.

15. An optical sensing system for determining a value of a measurand, the system comprising:
a source for producing a composite input signal comprising light in a plurality of different wavelength ranges;
a sensor comprising encoding means having a plurality of tracks, illumination means for receiving the composite input signal and for demultiplexing the composite input signal to produce an optical input signal associated with each track, each input signal comprising light in one of the wavelength ranges different from the wavelength ranges of the other input signals, each track including means responsive to the value of the measurand for modulating the intensity of the associated input signal in one of N different ways to produce a corresponding modulated signal, N being greater than 2, the sensor further comprising combining means for combining the modulated signals to produce an output signal, whereby the intensity of light in the output signal in the respective wavelength ranges encodes the value of the measurand;
a detector for detecting the intensity of light in each of the wavelength ranges in the output signal to thereby determine the value of the measurand; and
fiber-optic cable means for conveying the composite input signal from the source to the sensor and for conveying the output signal from the sensor to the detector.

16. The system of claim 15, wherein the illumination means also produces an optical reference signal comprising light in one of the wavelength ranges different from the wavelength ranges of the input signals, wherein the combining means combines the reference signal with the modulated signals to produce the output signal, and wherein the detector compares the intensity of light in each of the wavelength ranges associated with one of the input signals to the intensity of light in the wavelength range associated with the reference signal, to determine the modulation level produced by the track.

17. The system of claim 15, wherein each track comprises a plurality of modulation elements, each modulation element comprising means for modulating the intensity of the associated input signal in one of the N ways.

18. The system of claim 17, wherein at least one of the modulation elements comprises a pattern of nontransmitting areas.

19. The system of claim 17, wherein at least N-1 modulation elements comprise a single nontransmitting area having a variable size.

20. The system of claim 17, wherein at least one of the modulation elements comprises a pattern of reflecting areas.

21. The system of claim 15, wherein the illumination means comprises a filter associated with each track, each filter including means for receiving a portion of the composite input signal and for preferentially selecting wavelength components in the associated wavelength range to form the input signal for the track.

22. The system of claim 21, wherein the filters form a linear array adjacent to the tracks, and wherein the illumination means comprises means for receiving the composite input signal and for forming the composite input signal into a linear beam that strikes the array.

23. The system of claim 15, wherein the measurand is the position of a movable member, and wherein the encoder is coupled to the movable member such that the encoder moves when the movable member moves.

24. An optical method for determining a value of a mearsurand, the method comprising:
providing encoding means having a plurality of tracks, each track including means responsive to the value of the measurand for modulating the intensity of an associated input signal in one of N different ways to produce a corresponding modulated signal, N being greater than two;
producing a composite input signal comprising light in a plurality of different wavelength ranges and transmitting the composite input signal to the encoding means;
demultiplexing the composite input signal to produce an optical input signal associated with each track, each input signal comprising light in one of the wavelength ranges different from the wavelength ranges of the other input signals;
combining the modulated signals to produce an output signal, whereby the intensity of light in each of the wavelength ranges in the output signal encodes the value of the measurand.

25. The method of claim 24, wherein the composite input signal comprises light in a referenced wavelength range different from the wavelength ranges of the input signals, wherein the demultiplexing step demultiplexes the composite input signal to produce the optical input signals and an optical reference signal comprising light in the referenced wavelength range, and wherein the combining step includes combining the reference signal with the modulated signals to produce the output signal.

26. An optical sensing system for determining a value of a measurand, the system comprising:
a source for producing a composite input signal comprising light in a plurality of different wavelength ranges;

a sensor comprising encoding means having a plurality of tracks, illumination means for receiving the composite input signal and for demultiplexing the composite input signal to produce an optical input signal associated with each track, each input signal comprising light in one of the wavelength ranges different from the wavelength ranges of the other input signals, each track including means reponsive to the value of the measurand for modulating the intensity of the associated input signal to produce a corresponding modulated signal, the sensor further comprising combining means for combining the modulated signals to produce an output signal, whereby the intensity of light in the output signal in the respective wavelength ranges encodes the value of the measurand;

a detector for detecting the intensity of light in each of the wavelength ranges in the output signal to thereby determine the value of the measurand, the detector including means for assigning the intensity to one of N different levels, N being greater than 2; and fiber-optic cable means for conveying the composite input signal from the source to the sensor and for conveying the output signal from the sensor to the detector.

* * * * *